October 17, 1913.

DRAWING 7,943

A careful search has been made this day for the original drawing or a photolithographic copy of the same, for the purpose of reproducing the said drawing to form a part of this book, but at this time nothing can be found from which a reproduction can be made.

Finis D. Morris,
            Chief of Division E.

AWK

UNITED STATES PATENT OFFICE.

ISAAC STRAUB, OF CINCINNATI, OHIO.

IMPROVEMENT IN SAW-MILLS.

Specification forming part of Letters Patent No. 7,943, dated February 18, 1851.

*To all whom it may concern:*

Be it known that I, ISAAC STRAUB, of Cincinnati, in the county of Hamilton and State of Ohio, have invented a new and useful Improvement in Saw-Mills, of which the following is a full, clear, and exact description, reference being had to the accompanying drawing, which forms part of this specification, and represents a view in perspective of a saw-mill constructed on the principles of my invention.

My invention consists in a method of hanging and working a reciprocating saw in such manner that its cutting-edge shall advance against the wood in a curved line in descending, and shall recede in the same manner in ascending, thus having a rocking motion very similar to that imparted to the hand whip-saw, which causes it to cut a rolling or crowning kerf; also, in a method of straining the saw and causing it to run truly without the use of a saw-gate, by means of a spring, which, being compressed during the descent of the saw, acts, by its tensive force, to aid in raising it again; and, likewise, in a continuous feed-motion for a reciprocating saw, the motion of my saw being such as to adapt it to this kind of feed.

In the accompanying drawing, A A is the frame-work of the saw-mill, which supports the carriage and the saw-frame B. The carriage is not represented in the drawing, as it would obstruct the view of the other portions of the mill to which my improvements apply. The saw C, at its lower extremity, $a$, is connected directly with a crank-pin secured to the arm of a fly-wheel, D, on a horizontal shaft, E, to which a rotary motion is imparted by means of a belt running on a belt-pulley or by some other analogous device. The upper extremity, $b$, of the saw is pivoted to a frame, F, which is constructed to slide in an inclined position in guides $g\ g$. The latter are secured to the saw-frame B, and are inclined in such manner that the upper extremity of the saw shall move forward in descending and shall retrogade in ascending. This sliding frame is fitted with a bar, $c$, round which a helical spring, G, is coiled. The latter rests at its lower extremity upon a ring-guide, $d$, through which the bar $c$ is passed, and acts at its upper extremity against the lower face of a head, $e$, upon the bar, so that, as the sliding frame is drawn downward by the saw in descending, this spring, by opposing its descent, strains the saw, while, as the lower extremity of the saw is moved upward by the crank-pin, the spring, acting by its tensive force, draws up the sliding frame and the upper end of the saw connected therewith, and thus prevents the saw from buckling or bending during its upward as well as its downward movement. In the example here represented, the horizontal pinion-shaft H, which gives motion to the log-carriage, is moved in a continuous manner from the crank-shaft E through the intervention of a belt or cord, $h$, by means of which motion is imparted to an endless screw or worm, I, which gears into a worm-wheel, J, on the pinion-shaft H. The worm-shaft is fitted with a cone of pulleys, $k$, so that the feed may be increased or diminished by shifting the belt from one of these pulleys to the other, and the belt is tightened by means of a pair of tightening-pulleys, $i\ l$, secured to a sliding frame, M, which can be moved to strain the belt by means of a wedge, $n$, or other suitable means.

From the above description it is evident that the lower end of the saw is caused to describe a circle with the crank-pin, while the upper end at the same time moves obliquely forward and back, advancing in descending and retrograding in ascending. The result of these motions is that the cutting-edge of the saw moves with a rocking motion, and consequently cuts a curved or crowning kerf, the teeth of the saw rocking on the crown or most protuberant part of the timber in the line of the kerf. The saw-teeth therefore act on but a small portion of the wood at a time, and less force is required to actuate the saw than would be necessary if its teeth cut simultaneously throughout the whole depth of the wood. At the same time the motion is such that as soon as the saw begins to ascend its teeth leave the wood, and, therefore, when a continuous feed is used the teeth do not rub against the wood in ascending. While these advantages are gained by motions imparted to the opposite extremities of the saw-blade, the spring at its upper extremity strains it as much as is required during the descent of saw to steady it and cause it to cut smoothly, while at the same time, as the saw ascends, the spring prevents the buckling or bending of the plate by pulling it upward, and give back the power which was consumed in compressing. Hence the straining of the saw in this manner does not consume any appreciable amount of power, while it is forced to move as steadily as if it was strained in a heavy rigid saw-gate. This method of hanging the saw, therefore, combines the peculiar excellencies of both the frame and muley saws, while it is free from their defects. The continuous-feed motion frees the machinery from the jerks and jars, and consequent wear and tear, which is inseparable from the intermittent-feed motion ordinarily employed with reciprocating saws. It therefore enables the constructer to employ much lighter gearing, the power required to feed the log is less, and it is less liable to become disarranged.

What I claim as my invention, and desire to secure by Letters Patent, is—

The method of imparting a rocking or curved motion to the saw, and of straining the same by mechanical devices, substantially such as herein described.

In testimony whereof I have hereunto subscribed my name.

ISAAC STRAUB.

Witnesses:
  E. S. RENWICK,
  P. H. WATSON.